United States Patent
Chelaidite et al.

(10) Patent No.: US 10,408,289 B2
(45) Date of Patent: Sep. 10, 2019

(54) PARKING BRAKE TORQUE LOCKING MECHANISM

(71) Applicant: AKEBONO BRAKE INDUSTRY CO., LTD, Chuo-ku, Tokyo (JP)

(72) Inventors: Galus Chelaidite, South Lyon, MI (US); Waleed Al-Mahshi, Farmington Hills, MI (US); Carla Thomas, Royal Oak, MI (US)

(73) Assignee: Akebono Brake Industry Co., Ltd., Chuo-ku, Tokyo (JP)

( * ) Notice: Subject to any disclaimer, the term of this patent is extended or adjusted under 35 U.S.C. 154(b) by 34 days.

(21) Appl. No.: 15/669,037

(22) Filed: Aug. 4, 2017

(65) Prior Publication Data

US 2018/0045255 A1 Feb. 15, 2018

Related U.S. Application Data

(60) Provisional application No. 62/374,236, filed on Aug. 12, 2016.

(51) Int. Cl.
*F16D 127/06* (2012.01)
*F16D 63/00* (2006.01)
(Continued)

(52) U.S. Cl.
CPC .......... *F16D 63/004* (2013.01); *B60T 13/741* (2013.01); *F16D 65/16* (2013.01);
(Continued)

(58) Field of Classification Search
CPC .... F16D 63/004; F16D 65/16; F16D 2121/20; F16D 2121/24; F16D 2125/34; F16D 2127/06; B60T 13/741; B60T 13/748
See application file for complete search history.

(56) References Cited

U.S. PATENT DOCUMENTS

2,024,847 A 12/1935 Chambers
2,052,846 A 9/1936 Ryba
(Continued)

FOREIGN PATENT DOCUMENTS

EP 0851154 A2 7/1998
EP 0905402 A2 3/1999
(Continued)

OTHER PUBLICATIONS

Spring-Set Brakes, Fail-Safe Electrically Actuated Friction Brakes. The Carlyle Johnson Machine. Company, L.L.C. Accessed on Jun. 23, 2017 at < www.cjmco.com/downloads/specifications/single-disc-spring-set-brakes-sab.pdf>.
(Continued)

*Primary Examiner* — Thomas W Irvin
(74) *Attorney, Agent, or Firm* — The Dobrusin Law Firm, P.C.

(57) ABSTRACT

A brake system including a motor; a rotary to linear stage mechanism; and a torque locking mechanism. The rotary to linear stage mechanism in communication with the motor. The torque locking mechanism in communication with the motor. The torque locking mechanism comprises an electromagnet and a permanent magnet. During a brake apply the motor is adapted to move the rotary to linear stage mechanism so that at least one brake pad or at least one brake shoe is moved against a surface to create a clamp force. The electromagnet and the permanent magnet are adapted to cooperate to maintain the created clamp force.

20 Claims, 5 Drawing Sheets

(51) Int. Cl.
*F16D 65/16* (2006.01)
*B60T 13/74* (2006.01)
*F16D 121/20* (2012.01)
*F16D 121/24* (2012.01)
*F16D 125/34* (2012.01)

(52) U.S. Cl.
CPC ......... *B60T 13/748* (2013.01); *F16D 2121/20* (2013.01); *F16D 2121/24* (2013.01); *F16D 2125/34* (2013.01); *F16D 2127/06* (2013.01)

(56) References Cited

U.S. PATENT DOCUMENTS

| | | | |
|---|---|---|---|
| 2,292,704 A | | 8/1942 | Lillquist |
| 2,614,668 A | | 10/1952 | Waderlow et al. |
| 2,823,325 A | | 2/1958 | Stephan |
| 2,827,135 A | | 3/1958 | Sorchy |
| 2,949,172 A | | 8/1960 | Simons |
| 3,128,400 A | | 4/1964 | Hornschuch et al. |
| 3,425,529 A | | 2/1969 | Hayashi |
| 4,152,617 A | | 5/1979 | Janson |
| 4,228,874 A | | 10/1980 | Brinkman et al. |
| 4,239,095 A | | 12/1980 | De Jong |
| 4,510,405 A | | 4/1985 | Carroll et al. |
| 4,627,521 A | | 12/1986 | Takagaki et al. |
| 4,809,824 A | * | 3/1989 | Fargier ............... B60T 8/32 188/72.8 |
| 5,185,542 A | | 2/1993 | Lazorchak |
| 5,238,095 A | | 8/1993 | Pedu |
| 5,334,898 A | | 8/1994 | Skybyk |
| 5,348,123 A | | 9/1994 | Takahashi et al. |
| 5,808,392 A | | 9/1998 | Sakai et al. |
| 5,982,063 A | | 11/1999 | Lutz et al. |
| 6,072,256 A | | 6/2000 | Shon et al. |
| 6,269,917 B1 | | 8/2001 | Harting et al. |
| 6,315,092 B1 | * | 11/2001 | Schwarz ............. B60T 13/741 188/162 |
| 6,328,142 B1 | | 12/2001 | Kuwahara |
| 6,471,017 B1 | | 10/2002 | Booz et al. |
| 6,492,753 B2 | | 12/2002 | Zepp et al. |
| 6,536,561 B1 | | 3/2003 | Keller |
| 6,617,746 B1 | | 9/2003 | Maslov et al. |
| 6,948,597 B2 | | 9/2005 | Kuwahara |
| 7,385,332 B2 | | 6/2008 | Himmelmann et al. |
| 8,138,696 B2 | | 3/2012 | Vanderelli et al. |
| 8,344,571 B2 | | 1/2013 | Lee |
| 8,733,527 B2 | | 5/2014 | Greene |
| 9,341,222 B2 | * | 5/2016 | Masuda ............... B60T 13/741 |
| 9,586,678 B2 | | 3/2017 | Drennen et al. |
| 2002/0185342 A1 | | 12/2002 | Bausch et al. |
| 2004/0154880 A1 | | 8/2004 | Guaraldo |
| 2006/0032712 A1 | * | 2/2006 | Kollaard ............... F16D 28/00 188/72.8 |
| 2006/0170184 A1 | | 8/2006 | Lan et al. |
| 2008/0136279 A1 | | 6/2008 | Berndt et al. |
| 2011/0000751 A1 | | 1/2011 | Carlson et al. |
| 2011/0083935 A1 | | 4/2011 | Katano et al. |
| 2012/0073916 A1 | | 3/2012 | Chen |
| 2012/0169161 A1 | | 7/2012 | Woo |
| 2013/0049509 A1 | | 2/2013 | Shin |
| 2013/0186726 A1 | | 7/2013 | Collins |
| 2013/0257212 A1 | | 10/2013 | Marvin et al. |
| 2015/0027828 A1 | * | 1/2015 | Michelson ............ F16D 49/00 188/267 |
| 2015/0308528 A1 | | 10/2015 | Ambs et al. |
| 2015/0308529 A1 | | 10/2015 | Ambs et al. |
| 2015/0355038 A1 | | 12/2015 | Masuda |
| 2018/0001878 A1 | * | 1/2018 | Thomas .................. B60T 13/68 |
| 2018/0013332 A1 | * | 1/2018 | Al-Mahshi ........... H02K 7/1023 |
| 2018/0073585 A1 | * | 3/2018 | Masuda ................. B60T 13/74 |

FOREIGN PATENT DOCUMENTS

| | | |
|---|---|---|
| WO | 02/49891 A1 | 6/2002 |
| WO | 03/050437 A2 | 6/2003 |
| WO | 2005/031184 A1 | 4/2005 |
| WO | 2011/064713 A1 | 6/2011 |

OTHER PUBLICATIONS

Potentially Related U.S. Appl. No. 15/637,109, filed Jun. 29, 2017.
Potentially Related U.S. Appl. No. 15/631,339, filed Jun. 27 2017.
EEMODS 2011—Paper 060, Achieving High Electric Motor Efficiency, John Petro, 12 pages.

* cited by examiner

PARKING BRAKE TORQUE LOCKING MECHANISM

FIELD

These teachings relate to maintaining a clamp force in a brake system.

BACKGROUND

A disc brake system includes opposing brake pads that axe moved towards one another and into engagement with a brake rotor to create a clamp force to slow or stop a moving vehicle. A drum brake system includes opposing brake shoes that are moved away from one another and into engagement with a brake drum to create a clamp force to slow or stop a moving vehicle.

Both disc brake systems and drum brake systems typically include a parking brake system that functions to move the brake pads or brake shoes, respectively, into engagement with the respective brake rotor or brake drum to create a clamp force to maintain the vehicle in a stopped or parked position.

Some parking brake systems, brake systems, or both include a motor gear unit (MGU) and at least one rotary to linear stage mechanism. In disc brake systems, the MGU and the rotary to linear stage cooperate to move the brake pads into engagement with the brake rotor to create the clamp force to maintain the vehicle in a stopped or parked position. In drum brake systems, the MGU and the rotary to linear stage mechanism cooperate to move the brake shoes into engagement with the brake drum to create the clamp force to maintain the vehicle in a stopped or parked position.

In some parking brake systems, brake systems, or both, the rotary to linear stage mechanism is a high efficiency mechanism. Efficiency may refer to how well, or how 'efficiently" the mechanism converts or transfers torque from a motor or MGU into a linear load or output force. High efficiency rotary to linear stage mechanisms may be used to develop the clamp force faster while also reducing packaging space, weight, and cost of the system. However, after the clamp force is developed and the MGU is turned OFF, a high efficiency rotary to linear stage mechanism may back drive, which may result in an unintended reduction or elimination of clamp force, which may undesirably result in the vehicle rolling away.

Therefore, "self-locking" features have been proposed and incorporated into some brake systems to prevent back driving of high efficiency rotary to linear stage mechanisms after the clamp force is developed and the MGU is turned OFF. For example, various "non-back-drivable" elements such as worm type reduction gears and/or short pitch drive screws have been contemplated that incorporate friction to maintain the clamp force and prevent back driving. However, overcoming the friction of these self-locking features during a parking brake apply requires a bigger motor, which undesirably increases packing space, weight, and cost of the system.

Accordingly, a need exists for continued improvement. For example, it may be desirable to have a torque locking mechanism that maintains clamp force and prevents back driving of a brake system after electrical power to a motor of MGU is turned OFF. It may be desirable to have a torque locking mechanism that functions to prevent back driving of one or more rotary to linear stage mechanisms after the motor or MGU is turned OFF to prevent the clamp force from being prematurely reduced or eliminated. It may be desirable to have a torque locking mechanism that, during a parking brake apply, provides little to no friction or torque so that the clamp force can be developed quickly and efficiency, and after the parking brake apply is complete and the MGU is turned OFF, provides sufficient friction or torque to maintain the clamp force and prevent back driving of the system.

SUMMARY

These teachings provide a torque locking mechanism that maintains clamp force and prevents back driving of a brake system after electrical power to a motor or MGU is turned OFF. The torque locking mechanism functions to prevent back driving of one or more rotary to linear stage mechanisms after the motor or MGU is turned OFF to prevent the clamp force from being prematurely reduced or eliminated. During a brake apply or parking brake apply, the torque locking mechanism provides little to no friction or torque so that the clamp force can be developed quickly and efficiency, and after the parking brake apply is complete and the MGU is turned OFF, provides sufficient friction or torque to maintain the clamp force and prevent hack driving of the system.

These teachings provide a parking brake system or brake system comprising a motor; a rotary to linear stage mechanism in communication with the motor; and a torque locking mechanism in communication with the motor. Torque locking mechanism comprises an electromagnet; and a permanent magnet. During a parking brake apply or brake apply, the motor is adapted to generate torque to move the rotary to linear stage mechanism so that at least one brake pad or at least one brake shoe is moved against a surface of a rotor to generate a clamp force. The electromagnet and the permanent magnet cooperate to maintain the generated clamp force after the motor is turned OFF.

The torque locking mechanism comprises a rotor that is rotationally connected to a motor shaft of the motor. The rotor is adapted to axially move along an axis of the motor shaft. During the parking brake apply or the brake apply, the electromagnet is adapted to generate a magnetic force that neutralizes a magnetic force generated by the permanent magnet so that the rotor moves into a spaced apart relationship with the electromagnet so that the motor shaft is free to rotate and move the rotary to linear stage mechanism so that the at least one brake pad or the at least one brake shoe is moved against the surface of the rotor to generate the clamp force.

After the clamp force is generated, the electromagnet ceases to generate the magnetic force that is adapted to neutralize the magnetic force of the permanent magnet so that the rotor is magnetically attracted towards the permanent so that the rotor axially moves along the motor shaft into contact with the electromagnet so that the motor shaft is locked and unable to rotate.

The torque locking mechanism comprises a friction disc located between the rotor and the electromagnet. The rotor moves into contact with the friction disc after the electromagnet ceases to generate the magnetic force that is adapted to neutralize the magnetic force of the permanent magnet so that the motor shaft is locked and unable to rotate.

The electromagnet comprises a core and an electric coil, the core is rigidly connected to a housing of a brake system so that the core is restricted from moving and rotating, and the housing also includes the motor. The permanent magnet is rigidly connected to the core.

The torque locking mechanism comprises a rotor that is rotationally connected to a motor shaft of the motor, the rotor includes a pocket that supports therein the permanent magnet. During the parking brake apply or the brake apply, the electromagnet generates a magnetic force that is adapted to repel a magnetic force generated by the permanent magnet so that the permanent magnet axially moves away from the electromagnet and into a spaced apart relationship with the electromagnet so that the motor shaft is free to rotate and move the rotary to linear stage mechanism.

After the clamp force is generated, the electromagnet ceases to generate the magnetic force that repels the magnetic force of the permanent magnet so that the permanent magnet is magnetically attracted toward the electromagnet so that the permanent magnet axially moves into contact with the electromagnet so that the motor shaft is locked and unable to rotate.

The torque locking mechanism comprises a plurality of permanent magnets, and each of the permanent magnets are moveably supported in a corresponding plurality of pockets defined in the rotor.

The torque locking mechanism comprises a friction disc located between the electromagnet and the rotor. The permanent magnets are adapted to contact the friction disc when the electromagnet ceases to generate the magnetic force.

Each of the pockets comprises a vent passage to allow movement of the corresponding permanent magnet.

The torque locking mechanism comprises a rotor that is rigidly connected to a housing of the parking brake system or the brake system.

The electromagnet is rotatably connected to a motor shaft of the motor and is axially moveable along the motor shaft, the electromagnet is moveably supported on a plurality of pins that are rigidly connected to a housing. During the parking brake apply or the brake apply, the electromagnet generates a magnetic force that is adapted to repel a magnetic force of the permanent magnet so that the electromagnet axially moves away from the permanent magnet and into a spaced apart relationship with the permanent so that the motor shaft is free to rotate and move the rotary to linear stage mechanism.

After the clamp force is generated, the electromagnet ceases to generate the magnetic force that is adapted to repel the magnetic force of the permanent magnet so that the electromagnet is magnetically attracted toward the permanent magnet so that the electromagnet axially moves along the pins and into contact with the electromagnet so that the motor shaft is locked and unable to rotate.

The torque locking mechanism comprises a friction disc that is located between the electromagnet and the rotor.

DETAILED DESCRIPTION

This application claims the benefit of U.S. 62/374,236 filed on Aug. 12, 2016, the entire disclosure of which is hereby incorporated by reference herein for all purposes.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein provide a brake system. The brake system may function to create a clamp force to slow, stop, and/or maintain a vehicle in a stopped or parked position. The brake system may be any type of brake system. For example, the brake system may be an opposing brake system (i.e., a fixed caliper brake system) or a floating brake system (i.e., a floating caliper). The brake system may be a drum brake system. The brake system may be a service brake system. The brake system may generally include a brake rotor, one or more brake pads, and a brake caliper supporting one or more brake pistons. The brake system may generally include a brake drum, an expander mechanism, and a backing plate supporting one or more brake shoes.

A parking brake system may be added to or integrated with any brake system. The parking brake system may function to create a clamp force to maintain a vehicle in a stopped or parked position. The parking brake system may utilize one or more components of the brake system to create the clamp force. For example, during a parking brake apply, the parking brake system may be adapted to move one or more brake pistons and brake pads against a brake rotor to create the clamp force. The parking brake system may be adapted to move the one or more brake pistons and brake pads away from the brake rotor to release the clamp force. For example, during a parking brake apply, the parking brake system may be adapted to move an expander mechanism, which may thus move one or more brake shoes against the brake drum to create the clamp force or away from the brake drum to release the clamp force.

The clamp force may be any force that, when coupled with a brake pad or brake shoe coefficient of friction, functions to create drag to decelerate, slow, stop, and/or prevent movement or rotation of a brake rotor, drum, and/or a vehicle. The clamp force may be created during a standard brake apply (i.e., a brake apply force). The clamp force may be created during a parking brake apply (i.e., a parking brake force).

The parking brake system may comprise a motor gear unit (MGU). The motor gear unit (MGU) may function to create or generate a force or torque, and then transfer the force or torque to move one or more rotary to linear stage mechanisms, brake pistons, expander mechanisms, or a combination thereof to move the brake pistons or brake shoes against a brake rotor or brake drum create the clamp force. During release of the parking brake system to release the clamp force, the MGU may function to generate torque sufficient to move the one or more rotary to linear stage mechanisms, the one or more brake pistons, the one or more expander mechanisms, or a combination thereof so that the brake pads or brake shoes move away from the brake rotor or brake drum thus releasing the clamp force.

At least a portion of the MGU may be contained within a housing. The housing may be integrally formed with the brake caliper or the backing plate; removably attached to the brake caliper or the backing plate; permanently attached to the brake caliper or the backing plate; or attached in any suitable way to any part of a vehicle, such as a support, support bracket, or knuckle. The housing may contain a motor, one or more gears or gear trains, one or more locking mechanisms, or a combination thereof. One or more components of the MGU, including the motor, one or more gears, one or more components of the locking mechanism or a combination thereof may be rigidly connected or attached to the housing to prevent movement of the components.

The MGU may include a motor. The motor may be any suitable motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may have a motor output and a motor shaft. The motor output and the motor shaft may be connected such that when the motor shaft is locked or engaged by the torque locking mechanism, the motor and thus the motor output is restricted or prevented from rotating. Accordingly, when the motor shaft is unlocked or disengaged by the torque locking mechanism, the motor and thus the motor output can be rotated. The motor shaft may be in communication with the torque locking mechanism and the output shaft may be in communication with the rotary to linear stage mechanism or one or more gears (e.g., gear train).

The motor gear unit (MGU) may include one or more gears or gear trains that may function to transfer, amplify, increase, and/or decrease power output from the motor. The one or more gears or gear trains may function to increase or decrease an output speed of a motor, increase or decrease a torque output of a motor, or both.

The motor gear unit (MGU) may include one or more torque locking mechanisms. The torque locking mechanism may function to restrict or prevent the one or more rotary to linear stage mechanisms from back driving. The torque locking mechanism may function to restrict or prevent the parking brake system from prematurely releasing the clamp force. The torque locking mechanism may function to restrict or prevent the high efficiency mechanisms or rotary to linear stage mechanisms from back driving after electrical power to the motor or MGU is turned OFF or ceases to be applied. The torque locking mechanism may function to maintain a clamp force after electrical power to the motor or MGU is turned OFF or ceases to be applied. When the torque locking mechanism is locked or engaged, the clamp force developed by the parking brake system is maintained. When the torque locking mechanism is unlocked or disengaged, the clamp force developed by the parking brake system is released or not maintained. The torque locking mechanism may be located within the MGU housing; may be attached to the motor (e.g., to the motor shaft or to the motor output); may be attached to a rotary to linear stage mechanism; may be located internally within a motor, or a combination thereof. The torque locking mechanism may be located upstream of an output shaft of the motor that is connected to the rotary to linear stage mechanism.

The torque locking mechanism may include one or more electromagnets. When electrical power, voltage, or current may be supplied to a coil of the electromagnet so that the electromagnet may function to generate a magnetic field or force. The electrical power, voltage, or current may be supplied to a coil when electrical power, voltage, or current is supplied to the motor. The electromagnet may function to cease generating a magnetic field or force when electrical power, a voltage, or current is turned OFF or ceases to be applied to a coil of the electromagnet. The electrical power, voltage, or current may cease to be supplied to a coil when electrical power, voltage, or current ceases to be supplied to the motor. For example, the motor and the electromagnet may be connected in a parallel circuit so that both the motor and the electromagnet simultaneously receive electric power when electrical power is supplied. The electromagnet or the coil may be in electrical communication with a power source via a power connection (e.g., one or more wires). The magnetic field or force generated by the electromagnet may oppose, repel, or neutralize a magnetic field or force generated by one or more permanent magnets.

The electromagnet may be connected to the housing so that the electromagnet is restricted or prevented from moving rotationally, axially, or both. The electromagnet may be connected to a housing so that the electromagnet is free to move axially along an axis of the motor shaft, for example, but is restricting from rotating. The electromagnet may be connected to a housing so that the electromagnet is free to move rotate about an axis of the motor shaft, for example, but is restricting from axially moving along the motor shaft.

The electromagnet may include a core and a coil. The core may be an iron core concentrator. The coil may be an electrical coil that is electrically connected to the power source. When power is supplied to the coil, a magnetic force or field is venerated by the electromagnet. When power ceases to be supplied to the coil, a magnetic force or field is not generated by the electromagnet.

The electromagnet may include one or more pockets. The one or more pockets may function to support the electromagnet on one or more pins. The one or more pins may be fixedly connected to the motor or to the housing. The electromagnet axially may move along the pins. The one or more pockets may include one or more vents so that a vacuum or negative pressure is not formed in the pockets when the electromagnet is axially moved on the pins. The pockets may extend at least partially through the core of the electromagnet, the electrical coil, or both.

The torque locking mechanism may include one or more friction discs or friction portions. The friction disc may be located between two or more elements of the torque locking mechanism that face one another, that come into contact with one another during locking/engagement of the torque locking mechanism. The friction disc may function to increase friction between two surfaces or components that come together so that the elements do not move or are restricted from moving (e.g., rotating) relative to one another. For example, the friction disc may be located in one or more areas on the surfaces of the components of the torque locking mechanism. The friction disc may magnetically attract the magnetic field or force generated by the permanent magnet, electromagnet, or both.

The torque locking mechanism may include one or more permanent magnets. The permanent magnet may function to generate a magnetic field or force. The magnetic field or force generated by the permanent magnet may oppose, repel, or neutralize the magnetic field or force generated by the electromagnet. The permanent magnet may be magnetically attracted to the rotor. The permanent magnet may be magnetically attracted to core, the electromagnet, or both when the electromagnet is not generating its magnetic field or force. The permanent magnet may magnetically attract the rotor and cause the rotor to axially move along a motor shaft when the electromagnet is not generating its magnetic field or force. The magnetic field or force generated by the permanent magnet may be neutralized when the electromagnet is generating its magnetic force, and thus an output or shaft of the motor may be free to rotate. The permanent magnet may be rotationally and/or axially restricted from moving. The permanent magnets may be rotationally and/or axially adapted to move when attracted or repelled by an electromagnet and/or a rotor made of magnetic material.

The one or more permanent magnets may be located in one or more corresponding pockets of the rotor and adapted to axially and/or rotationally move within the pockets. The one or more pockets may extend at least partially through the rotor and may include at least one vent so that the permanent magnets can move without creating negative pressure or a vacuum in the pocket.

The torque locking mechanism may include a rotor. The rotor may be rigidly attached to a motor shaft of the motor and may rotate therewith or may be restricted from rotating therewith. The rotor may be rigidly attached to a motor shaft of the motor and may axially move along the motor shaft, or the rotor may be restricted from axially moving. The rotor may include one or more pockets for receiving one or more corresponding permanent magnets. The rotor may be made of plastic.

The torque locking mechanism may include one or more springs. The spring may function to assist in moving any component(s) of the torque locking mechanism. For example, the spring may function to assist in moving or biasing the electromagnet towards or away from a permanent magnet and/or rotor when the electromagnet is or is not generating its magnetic field. For example, the spring may function to assist in moving or biasing the rotor towards or away from the electromagnet.

The one or more rotary to linear stage mechanisms may function to receive a rotary force or torque form the motor and/or MGU and then transfer the rotary force or torque into an axial or linear force. The axial or linear force may be adapted to move one or more brake pistons or expander mechanisms to create or release the clamp force. The rotary to linear stage mechanism may be a linear actuator. The rotary to linear stage mechanism may be an expander mechanism. The rotary to linear stage mechanism may be an actuator. The rotary to linear stage mechanism may include a spindle and a nut. The rotary to linear stage mechanism may include one or more ball screws, roller screws, ball ramps, or a combination thereof. Exemplary ball screws may utilize ball bearings as load transfer elements between the nut and spindle or screw. During movement of the ball screw, the ball bearings may circulate along races or grooves between the spindle and the nut. A roller screw or planetary screw may be similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both. A ball ramp may include a rotating side and a stationary side with rolling elements interposed there between. A torque input causes the rotating side to rotate, which also causes the rolling elements to engage and move alone ramps between the rotating side and stationary side. The ramps include a deep end and a shallow end. The ramps start with a deep end and end with a shallow end. When the rotating side is rotated such that the rolling elements move to the shallow side of the ramp, the rolling elements provide an axial force against the stationary side, thus axially moving the stationary side.

The one or more rotary to linear stage mechanisms may be may be one or more high efficiency devices, one or more low efficiency devices, or both. However, preferably, all of the rotary to linear stages are high efficiency devices. A high efficiency device is a device that is more efficient than a low efficiency device. Efficiency may refer to how well, or how "efficiently" the device converts or transfers torque or a rotational load input form a motor or MGU into a linear load or output force. Depending on one or more considerations, such as lead angle and coefficient of friction, the one or more high efficiency devices may have an efficiency on the order of approximately 60% or more, approximately 70% or more, approximately 80% or more, approximately 85% or more, approximately 90% or more, approximately 95% or more, 97% or more, or even 99% or more. One or more rotary to linear stage mechanisms may correspond to each piston or expander mechanism.

The one or more rotary to linear stage mechanisms may be non-locking. In other words, because the coefficient of friction between the components in a high efficiency device is generally low, back driving may occur when a reaction force applied to the mechanism (for example, to the spindle, the nut, or both) is greater than the static force or coefficient of friction of the high efficiency device. This may undesirably cause the mechanism to rotate or move in an opposing direction after a clamping force has been created. The torque locking mechanism according to the teachings herein may prevent back driving, and thus sustain the linear output force and/or maintain the clamp force of the parking brake system. Without such a torque locking feature, the high efficiency devices may undesirably, and prematurely, release the clamp force after the MGU is turned OFF, which may cause a vehicle to unintentionally move.

The brake system, the parking brake system, or both may include one or more controllers. The controller may function to turn the motor ON and OFF by sending electrical power, voltage, or current to the motor. The controller may function to turn the electromagnet ON and OFF by sending electrical power, voltage, or current to the motor so that the electromagnet generates or ceases to generate a magnetic field, respectively. Turning ON the motor may also result in simultaneously turning ON the electromagnet. Turning OFF the motor may also result in simultaneously turning OFF the electromagnet. Turning ON and OFF the motor may be independent of turning the electromagnet ON and OFF.

The controller may function to monitor the clamp force as it is being created, and may function to turn OFF the motor and/or the electromagnet (e.g., stop or cease ending power thereto) after a suitable clamp force has been created and/or detected. When the controller receives a signal to release the parking brake, the controller may function to turn ON the motor and/or the electromagnet to generate power to release the clamp force. The signal to the controller may be provided by a suitable means, such as pushing a button, pulling a lever or cable. The signal may be provided automatically when a vehicle is placed in a parking gear, for example. The controller may be in communication with the parking brake system, the motor, the motor gear unit, or a combination thereof to control one or more functions thereof. The controller may communicate with the parking brake system, the motor, the motor gear unit, the electromagnet, or a combination thereof by wire or wirelessly.

The controller may include an electronic circuit to provide a voltage or a particular voltage polarity to the motor. For example, one polarity may be provided to the motor so that an output of the motor rotates in an apply direction, and the opposing polarity may be provided to the motor so that the output of the motor rotates in a release direction. The electronic circuit is located inside the controller, or Electronic Control Unit (ECU). The electronic circuit is called H-Bridge and is currently used to provide the necessary polarity to the motor to apply and release an electromechanical parking brake.

An additional electronic circuit may be needed to provide a constant voltage polarity to the electromagnet regardless of the voltage polarity that is provided to the motor. The additional circuit may be located inside the MGU. Stated another way, even though one polarity may be provided to the motor to rotate in an apply direction and the opposing polarity may be provided to the motor to rotate in a release direction, the additional electronic circuit ensures that a predetermined polarity is provided to the electromagnet regardless of the polarity that is provided to the motor. This type of circuit ensures that the correct polarity is always provided to the electromagnet for either input polarity (+ or −) at the Motor Gear Unit (MGU) terminals. Those skilled in the art may understand this type of circuit as providing "reverse polarity protection." Those skilled in the art may understand this type of circuit to be a diode bridge. This type of circuit may comprise an arrangement of four or more diodes in a bridge configuration. The additional electronic circuit, the diode bridge, is located inside the MGU, and is electrically connected to the MGU terminals and the coil of the electromagnet. The additional electronic circuit ensures that the magnetic field generated by the electromagnet will neutralize the magnetic field from the permanent magnets when the electromagnet is powered. The additional electronic circuit, the diode bridge, is not electrically connected between the MGU terminals and the motor because the polarity needed at the motor changes depending on the direction of motor rotation.

Figure 1:
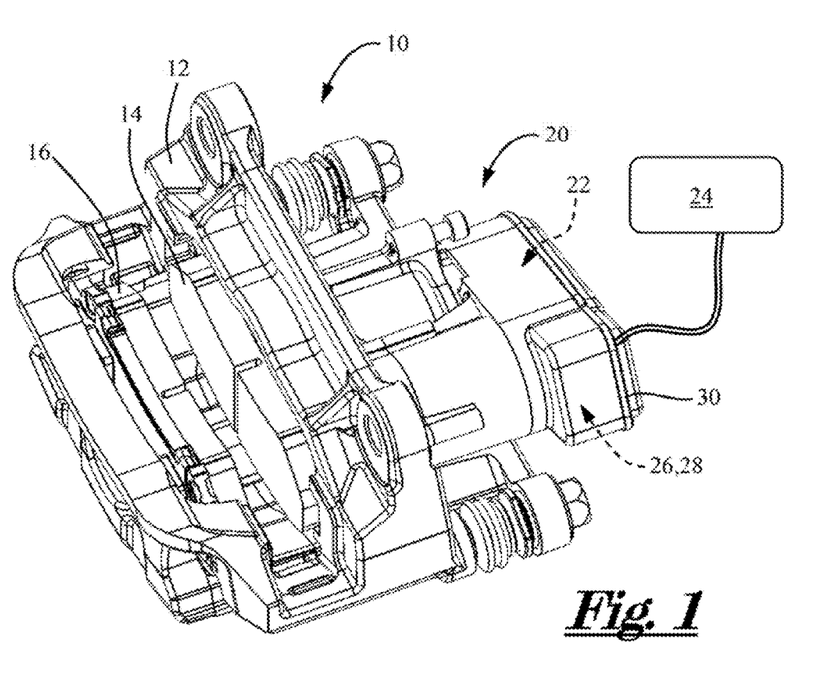
FIG. 1 is a perspective view of an exemplary brake system that is a disc brake system.

FIG. 1 illustrates a brake system 10. The brake system 10 includes a brake caliper 12 supporting an inboard brake pad 14 and an outboard brake pad 16. The brake pads 14, 16 are arranged so that the friction material of each brake pad 14, 16 faces a side of a brake rotor. The brake system 10 includes a parking brake system 20. The parking brake system 20 includes a motor gear unit (MGU) 22 and a controller 24. The MGU 22 includes a motor 26 and a torque locking mechanism 28, both of which are located in a housing 30.

Figure 2:
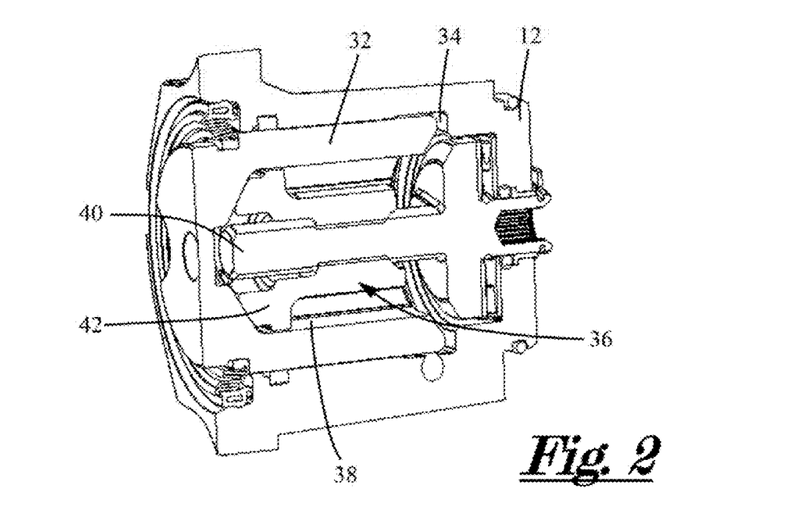
FIG. 2 is a perspective, cross-sectional view of an exemplary brake piston and rotary to linear stage mechanism of the disc brake system of FIG. 1.

FIG. 2 illustrates a brake piston 32 located in a caliper bore 34 defined in the brake caliper 12. A rotary to linear stage mechanism 36 is at least partially located in a piston bore 38 of the brake piston 32. The rotary to linear stage mechanism 36 comprises a spindle 40 and a nut 42. The spindle 40 comprises an input portion that is in rotational communication with the MGU 22 or motor 26. Rotation of the spindle 40 via the MGU 22 or motor 26 causes the nut 42 to move axially.

Figure 3:
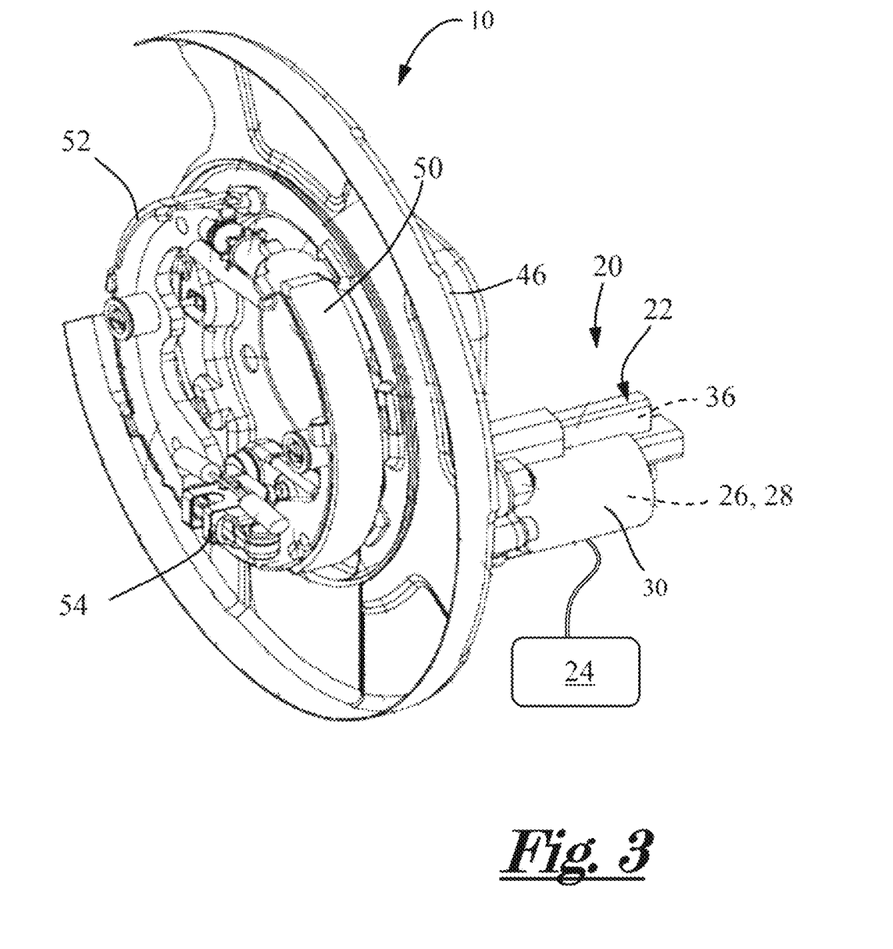
FIG. 3 is a perspective view of an exemplary brake system that is a drum brake system.

FIG. 3 illustrates another brake system 10. The brake system 10 includes a backing plate 46 supporting a pair of brake shoes 50, 52. The brake shoes 50, 52 are arranged such that the friction material of each brake shoe 50, 52 faces an inner portion of a brake drum. The brake system 10 includes a parking brake system 20. The parking brake system 20 includes a motor gear unit (MGU) 22, a controller 24, and a rotary to linear stage mechanism 36. The MGU 22 includes a motor 26 and a torque locking mechanism 28, both of which are located in a housing 30. The rotary to linear stage mechanism 36 is in communication with an expander mechanism 54 of the brake system 10.

Figures 4, 5:
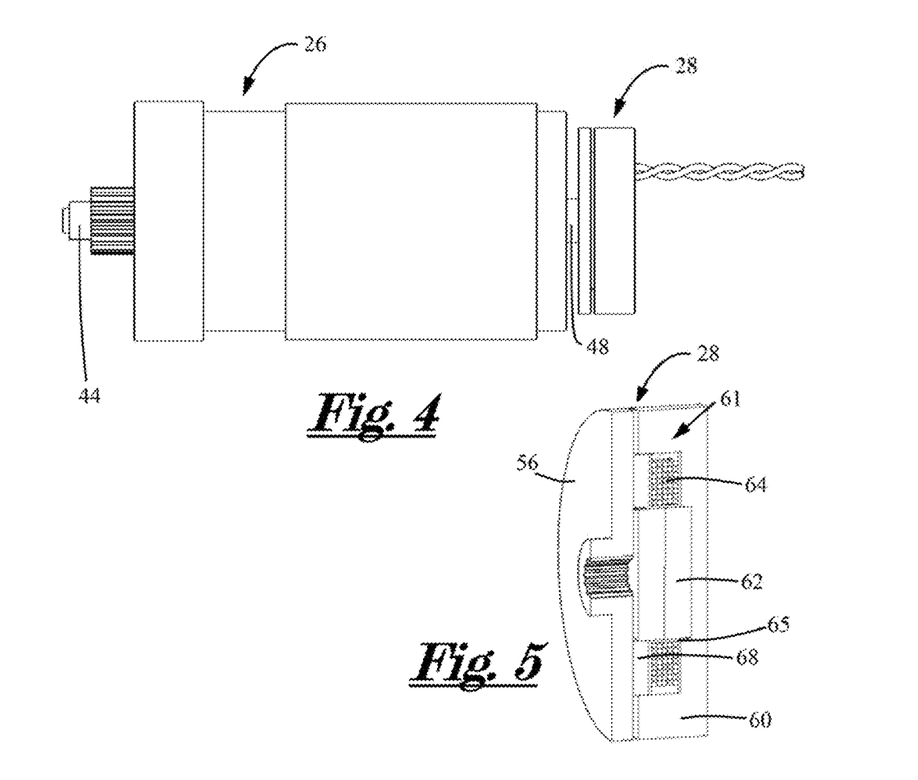
FIG. 4 is a perspective view of a motor and a torque locking mechanism.
FIG. 5 is a perspective, cross-sectional view of the torque locking mechanism of FIG. 4.

FIG. 4 illustrates a motor 26 and a torque locking mechanism 28 for use with the brake system 10 illustrated in FIGS. 1 and/or 3. The torque locking mechanism 28 is in communication with a motor shaft 48 of the motor 26. The motor 26 also includes an output shaft 44 that is in direct communication with a rotary to linear stage mechanism 36 of FIG. 2 or FIG. 3, for example, or in direct communication with one or more gears (e.g., a gear train) that is in communication with a rotary to linear stage mechanism 36.

Figure 6:
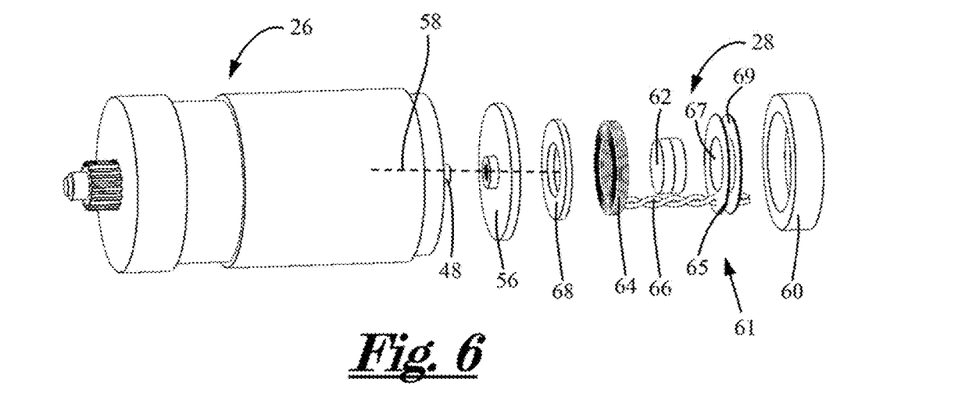
FIG. 6 is a perspective view the motor of FIG. 4, and an exploded perspective view of the torque locking mechanism of FIG. 4.

Referring to FIGS. 5 and 6, the torque locking mechanism 28 includes a rotor 56 that is rotationally fixed to the motor shaft 48 of the motor 26, but axially moveably along an axis 58 of the motor shaft 48. The torque locking mechanism 28 includes an electromagnet 61 comprising a core 60 and an electrical coil 64 that is in electrical communication with a power source via an electrical connection 66. The core 60 is rigidly attached to a housing 30 (of FIG. 1 or FIG. 2, for example) so that the electromagnet 61 is restricted from moving and rotating. The torque locking mechanism 28 also includes a permanent magnet 62 and a friction disc 68 located between the rotor 56 and the electromagnet 61. The torque locking mechanism 28 includes a bonnet 65 that is adapted to maintain a position of the permanent magnet 62 and electrical coil 64 relative to the core 60. More specifically, the bonnet 65 comprises a center bore 67 adapted to support the permanent magnet 62 and a channel 69 disposed around the center bore 67 for supporting the coil 64.

Referring to FIGS. 1-6, before the parking brake is actuated (i.e., during a free running condition of the vehicle; when the motor 26 is OFF; and/or when electrical power is not being supplied to the motor 26 or electrical coil 64), the rotor 56 is in contact with the friction disc 68 and/or the electromagnet 61 due to the magnetic field or force generated by the permanent magnet 62, which causes the rotor 56 to axially move along the motor shaft 48 and into contact with the friction disc 68 and/or the electromagnet 61. Because the core 60 is rigidly attached to the housing 30 and is restricted from moving or rotating, the rotor 56 and thus the motor shaft 48 and output shaft 44 are also fixed to the housing 30 and restricted from rotating and/or back driving. The torque locking mechanism 28 is therefore in a locked or engaged position.

After the parking brake is actuated, electrical power is supplied to the electrical coil 64, which functions to generate a magnetic field or force that opposes and thus neutralizes the magnetic field or force generated by the permanent magnet 62 so that the permanent magnet 62 no longer attracts and retains the rotor 56 against the friction disc 68 and/or the electromagnet 61. The output shaft 44, the motor shaft 48, and rotor 56 are thus free to rotate. The electrical power is also supplied to the motor 26, which causes the output shaft 44, motor shaft 48, and rotor 56 to rotate in an apply direction. Because the rotor 56 is no longer forced against the friction disc 68 by way of the magnetic field generated by the permanent magnet 62, as the motor shaft 48 and rotor rotate, the rotor 56 can axially move away from the friction disc 68 and/or electromagnet 61 so that a gap is defined there between. The torque locking mechanism 28 is therefore in an unlocked or disengaged position.

Referring to the disc brake system of FIGS. 1-2, with the torque locking mechanism 28 unlocked or in a disengaged position, rotation of the output shaft 44 in an apply direction causes the rotary to linear stage mechanism 36 to move the brake piston 32, which causes the inboard brake pad 14 to be moved against the brake rotor to create the clamp force. Referring to the drum brake system of FIG. 3, with the torque locking mechanism 28 unlocked or in a disengaged position, rotation of the output shaft 44 in an apply direction causes the rotary to linear stage mechanism 36 to move the expander mechanism 54, which causes the brake shoes 50, 52 to move against the brake drum to create the clamp force.

With continued reference to FIGS. 1-6, after a desired clamp force is generated, the electrical power ceases or is no longer supplied to the electrical coil 64 so that the electromagnet 61 no longer generates a magnetic field or force. Accordingly, the magnetic field or force from the permanent magnet 62 once again attracts the rotor 56 so that the rotor 56 is axially moved and retained against the friction disc 68 and/or the electromagnet 61 so that the rotor 56, the motor shaft 48, and the output shaft 44 are once against fixed to the housing 30 and restricted from rotating and/or back driving. The torque locking mechanism 28 is therefore locked and/or in an engaged position and the developed clamp force is maintained.

If a re-clamp is required, electrical power is again supplied to the electrical coil 64 so that the electromagnet 61 generates the magnetic field or force that opposes and neutralizes the magnetic field or force of the permanent magnet 62 so that the permanent magnet 62 no longer attracts and retains the rotor 56 against the friction disc 68 and/or the electromagnet 61. The electrical power is also supplied to the motor 26, which causes the output shaft 44 to rotate in an apply direction, which causes the rotary to linear stage 36 to move the brake piston 32 or expander mechanism 54 so that the inboard brake pad 14 or brake shoes 50, 52 are further against the brake rotor or brake drum, respectively to increase the clamp force. After a desired clamp force is achieved, the electrical power ceases or is no longer supplied to the motor 26 and electrical coil 64, and the magnetic field or force of the permanent magnet 56 is no longer neutralized. Accordingly, the magnetic field or force of the permanent magnet 56 attracts and thus causes the rotor 56 to move against the friction disc 68 and/or the electromagnet 61 so that the torque locking mechanism 28 engages or locks and restricts the rotor 56, motor shaft 48 and output shalt 44 from rotating and/or back driving. The torque locking mechanism 28 is again locked and/or in an engaged position and the developed clamp force is maintained.

Figure 7:
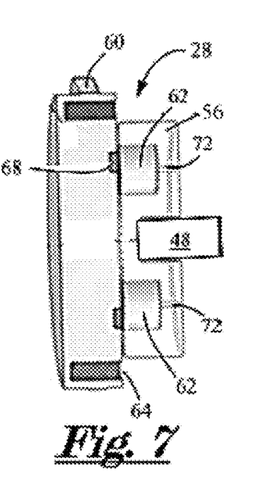
FIG. 7 is a perspective, cross-sectional view of a torque locking mechanism.
Figure 8:
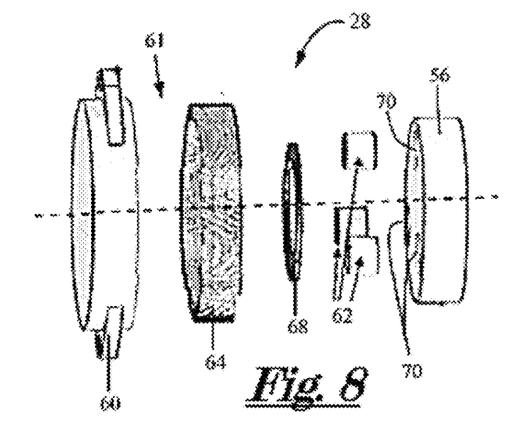
FIG. 8 is a perspective, exploded view of the torque locking mechanism of FIG. 7.

FIGS. 7 and 8 illustrate another torque locking mechanism 28 for use with a motor, like the motor 26 illustrated in FIGS. 4 and 6. The torque locking mechanism 28 is in communication with a motor shaft 48 and includes a rotor 56 that is rotationally locked to the motor shaft 48. The rotor 56 includes one or more pockets 70, each of which are adapted receive a permanent magnet 62. The permanent magnets 62 are adapted to axially move within the corresponding pockets 70 in a direction generally parallel to a rotational axis of the motor shaft 48. The rotor 56 includes vent passages 72 so that each pocket 70 can be vented to atmosphere to allow movement of a corresponding permanent magnet 62 (i.e., to prevent a vacuum or negative pressure in the pocket 70 when a permanent magnet 62 is moved therein). The torque locking mechanism 28 also includes a friction disc 68 and an electromagnet 61 comprising a core 60 and an electrical coil 64. The friction disc 68 is located in a pocket or groove defined in the core 60. The core 60 is rigidly attached to the housing 30 and the electrical coil 64 that is in electrical communication with a power source.

Figure 9:
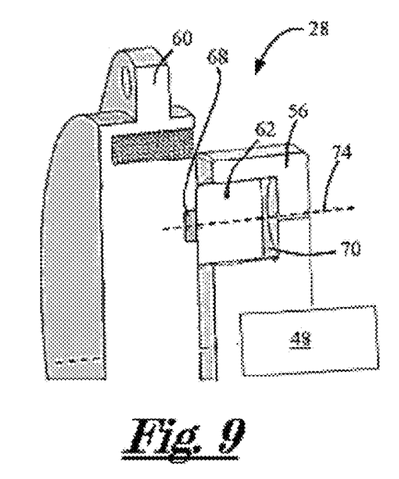
FIG. 9 is a partial, perspective, cross-sectional view of the torque locking mechanism of FIG. 7 in a locked or engaged position.
Figure 10:
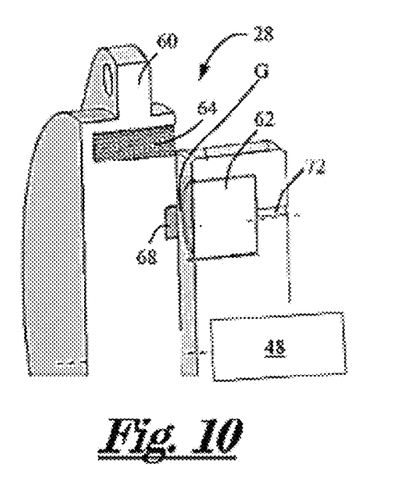
FIG. 10 is a partial, perspective, cross-sectional view of the torque locking mechanism of FIG. 7 in an unlocked or disengaged position.

Referring to FIGS. 1-3 and 7-10 before the parking brake is actuated (i.e., during a free running condition of the vehicle; when the motor 26 is OFF; and/or when electrical power is not being supplied to the motor 26 or electrical coil 64), the permanent magnets 62 are magnetically attracted to the friction disc 68 and/or the electromagnet 61, which cause the permanent magnets 62 to axially move within the pockets 70 into contact with the friction disc 68 and/or the electromagnet 61. FIG. 9 illustrates no gap defined between the permanent magnet 62 and the friction disc 68 and/or core 60. Because the core 60 is rigidly attached to the housing 30 and restricted from moving, when the permanent magnets 62 are in contact with the friction disc 68 and/or the electromagnet 61, the rotor 56 and thus the motor shaft 48 and output shaft 44 are also fixed to the housing 30 and restricted from rotating and/or back driving. The torque locking mechanism 28 is therefore in a locked or engaged position.

After the parking brake is actuated, the electronic circuit (e.g., diode bridge) ensures that the correct voltage polarity is provided to the electrical coil 64. The electrical power is supplied to the electrical coil 64 so that the electromagnet 61 functions to venerate a magnetic field or force that opposes the magnetic field or force of the permanent magnets 62, which causes the permanent magnets 62 to axially move within the pockets 70 away from the core 60 and out of contact with the friction disc 68 and/or the electromagnet 61. See FIG. 10 where a gap G is defined between the permanent magnet 62 and the core 60 and/or friction disc 68. Accordingly, the permanent magnets 62 no longer attract or hold the rotor 56 against the friction disc 68 and/or the electromagnet 61. The torque locking mechanism 28 is therefore in an unlocked or disengaged position, and the output shaft, motor shaft 48, and rotor 56 are thus free to rotate. The electrical power is also supplied to the motor 26, which causes the output shaft 44, motor shaft 48, and rotor 56 to rotate in an apply direction causing the rotary to linear stage mechanism 36 to move the corresponding brake piston 32 or expander mechanism 54, which causes the corresponding brake pad or brake shoe to move against the brake rotor or brake drum to create the clamp force.

With continued reference to FIGS. 1-3 and 7-10, after a desired clamp force is generated, the electrical power is no longer supplied to the electrical coil 64 so that the electromagnet 61 no longer generates the magnetic field or force. Accordingly, the permanent magnets 62 are magnetically attracted to the friction disc 68 and/or the electromagnet 61, which causes the permanent magnets 62 to axially move into contact with the friction disc 68 and/or the electromagnet 61 so that the rotor 56, the motor shaft 48, and the output shaft 44 are fixed to the housing 30 and restricted from rotating and/or back driving. See FIG. 9 where no gap is defined between the permanent magnet 62 and the core 60 and/or friction disc 68. The torque locking mechanism 28 is therefore locked and/or in an engaged position and the clamp force is maintained.

If a re-clamp is required, electrical power is again supplied to the electrical coil 64 so that the electromagnet 61 generates the magnetic field or force that opposes the magnetic field or force of the permanent magnets 62, which causes the permanent magnets 62 to axially move out of contact with the friction disc 68 and or the electromagnet 61 so that the rotor 56 is no longer held against the friction disc 68 and/or the electromagnet 61. The torque locking mechanism 28 is therefore in an unlocked or disengaged position. The electrical power is also supplied to the motor 26, which causes the output shaft 44, motor shaft 48, and rotor 56 to rotate in an apply direction causing the rotary to linear stage mechanism 36 to move the corresponding brake piston 32 or expander mechanism 54, which causes the corresponding brake pad or brake shoe to move against the brake rotor or brake drum to create the clamp force.

Figure 11:
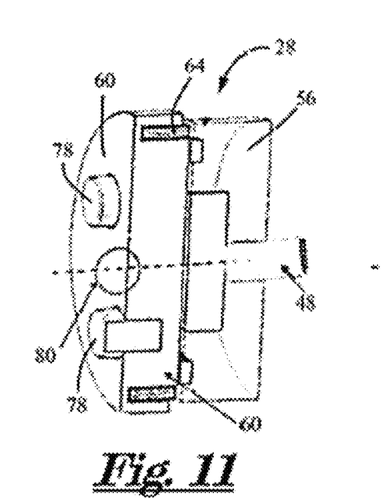
FIG. 11 is a perspective, cross-sectional view of a torque locking mechanism.
Figure 12:
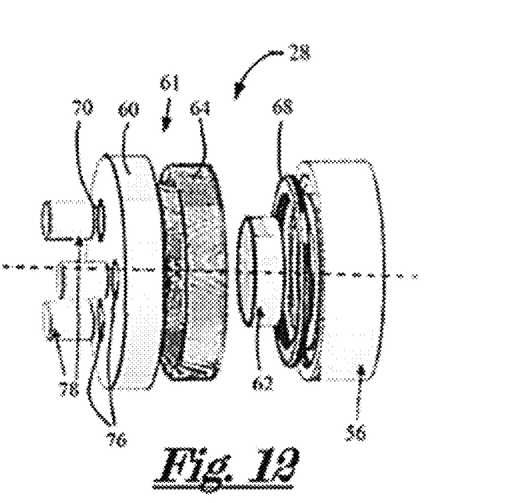
FIG. 12 is a perspective, exploded view of the torque locking mechanism of FIG. 11.
Figure 13:
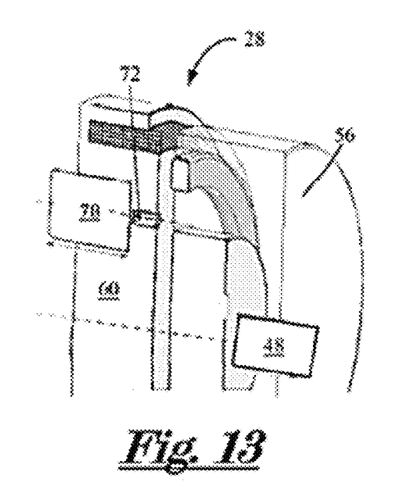
FIG. 13 is a partial, perspective, cross-sectional view of the torque locking mechanism of FIG. 11 in an unlocked or disengaged position.
Figure 14:
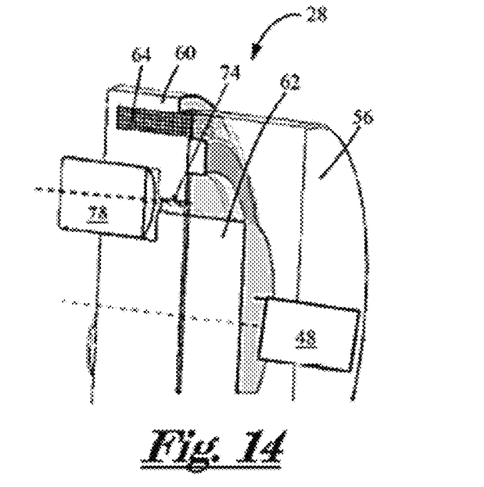
FIG. 14 is a partial, perspective, cross-sectional view of the torque locking feature of FIG. 11 in a locked or engaged position.

FIGS. 11 and 12 illustrate another torque locking mechanism 28 for use with a motor, like the motor 26 illustrated in FIGS. 4 and 6. The torque locking mechanism 28 is in communication with a motor shaft 48 and includes a rotor 56 that is rotationally locked to the motor shaft 48. The torque locking mechanism 28 also includes an electromagnet 61 comprising a core 60 and an electrical coil 64 that is in electrical communication with a power source. The core has pockets 70 and vents 72 for venting each pocket 70. The pockets 70 are adapted to receive corresponding pins 76 that are rigidly attached to the housing 30. The electromagnet 61 is adapted to axially move along the pins 78 towards and away from a permanent magnet 62 that is fixed to the rotor 56. The torque locking mechanism 28 also includes a friction disc 68 and may optionally include a spring 80.

Referring to FIGS. 1-3 and 11-14 before the parking brake is actuated (i.e., during a free running condition of the vehicle; when the motor 26 is OFF; and/or when electrical power is not being supplied to the motor 26 or electrical coil 64), the permanent magnet 62 magnetically attracts the electromagnet 61, which causes the electromagnet 61 to axially move along the pins 78 and into contact with the permanent magnet 62, the friction disc 68, and/or the rotor 56. See FIG. 14. Because the pins 78 are rigidly attached to the housing 30 and restricted from moving, when the electromagnet 61 is moved into contact with the rotor 56 and/or friction disc 68, the rotor 56 and thus the motor shaft 48 and output shaft 44 are also fixed to the housing 30 and restricted from rotating and/or back driving. The torque locking mechanism 28 is therefore in a locked or engaged position.

After the parking brake is actuated, the electrical circuit (e.g. diode bridge) ensures that the correct voltage polarity is provided to the electrical coil 64. The electrical power is supplied to the electrical coil 64 so that the electromagnet 61 generates a magnetic field or force that opposes the magnetic field or force of the permanent magnet 62, which causes the electromagnet 61 to axially move along the pins 78 away from and out of contact with the permanent magnet 62, friction disc 68, and/or rotor 56 (See FIG. 13). Accordingly, the torque locking mechanism 28 is in an unlocked or disengaged position, and the output shaft, motor shaft 48, and rotor 56 are thus free to rotate. The electrical power is also supplied to the motor 26, which causes the output shaft 44, motor shaft 48, and rotor 56 to rotate in an apply direction. This causes the rotary to linear stage mechanism 36 to move the corresponding brake piston 32 or expander mechanism 54, which causes the corresponding brake pad or brake shoe to move against the brake rotor or brake drum to create the clamp force.

With continued reference to FIGS. 1-3 and 11-14, after a desired clamp force is generated, the electrical power is no longer supplied to the electrical coil 64 so that the electromagnet 61 no longer generates the magnetic force that opposes and repels the magnetic field or force of the permanent magnet 62. Accordingly, the permanent magnet 62 magnetically attracts the electromagnet 61, causing the electromagnet 61 to axially move into contact with the permanent magnet 62, friction disc 68, and/or rotor 56 (See FIG. 14). The torque locking mechanism 28 is therefore in a locked or engaged position.

If a re-clamp is required, electrical power is again supplied to the electrical coil 64 so that the electromagnet 61 generates the magnetic force that opposes and repels the magnetic force of the permanent magnet 62. Accordingly, the electromagnet 61 axially moves away from the permanent magnet 62, friction disc 68, and/or rotor 56 (See FIG. 13). The torque locking mechanism 28 is therefore in an unlocked or disengaged position. The electrical power is also supplied to the motor 26, which causes the output shaft 44, motor shaft 48, and rotor 56 to rotate in an apply direction so that the clamp force can be generated or increased.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The use of the terms "comprising" or "including" to describe combinations of elements, components or steps herein also contemplates embodiments that consist essentially of the elements, components or steps.

Plural elements, components or steps can be provided by a single integrated element, component or step. Alternatively, a single integrated element, component or step might be divided into separate plural elements, components or steps. The disclosure of "a" or "one" to describe an element, component or step is not intended to foreclose additional elements, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake system comprising:
a motor; and
a torque locking mechanism;
   wherein during a brake apply, the torque locking mechanism is in an unlocked position allowing the motor to generate torque to move a brake pad or a brake shoe to generate a clamp force,
   wherein after the motor ceases generating the torque, the torque locking mechanism moves into a locked position to restrict an output shaft of the motor from rotating and/or back driving, and
   wherein the torque locking mechanism comprises an electromagnet, the electromagnet is supported on one or more pins, the electromagnet is configured to slide on the one or more pins between the locked position and the unlocked position.

2. The brake system of claim 1, wherein the motor comprises a rotor,
   wherein in the unlocked position, the electromagnet is spaced apart from the rotor; and
   wherein in the locked position, the electromagnet is in contact with the rotor or in contact with one or more components that are in contact with the rotor.

3. The brake system of claim 2, wherein the rotor is rotationally connected to the output shaft of the motor, the rotor comprises a magnet;
   wherein during the brake apply, the electromagnet is adapted to generate a magnetic force that opposes a magnetic force generated by the magnet so that the electromagnet moves away from the magnet and into the unlocked position.

4. The brake system of claim 3, wherein after the motor ceases generating the torque, the electromagnet ceases generating the magnetic force that opposes the magnetic force generated by the magnet and the electromagnet is magnetically attracted towards the magnet so that the electromagnet moves towards the magnet into the locked position.

5. The brake system of claim 4, wherein the torque locking mechanism comprises a friction disc, and
   wherein in the locked position, the electromagnet is in contact with the friction disc.

6. The brake system of claim 4, wherein the electromagnet comprises a core and an electric coil, the core is rigidly connected to a housing of the motor so that the electromagnet is restricted from rotating.

7. The brake system of claim 3, wherein the magnet is connected to the rotor and rotates with the rotor while the motor is generating the torque.

8. The brake system of claim 1 wherein the electromagnet comprises one or more pockets that are configured to receive a respective one of the one or more pins.

9. The brake system of claim 8, wherein the one or more pockets are free from extending through an entire thickness of the electromagnet.

10. The brake system of claim 9, wherein one or more vents are in contact with the one or more pockets.

11. The brake system of claim 1, wherein the electromagnet is rigidly connected to a housing to restrict the electromagnet from rotating.

12. A brake system comprising:
a) a motor comprising a motor shaft;
b) a rotary to linear stage mechanism in communication with the motor; and
c) a torque locking mechanism comprising:
   i) an electromagnet; and
   ii) a permanent magnet,
wherein the electromagnet is moveably supported on one or more pins;
wherein during a brake apply, the electromagnet is adapted to generate a magnetic force that is adapted to repel a magnetic force of the permanent magnet so that the electromagnet axially moves in a direction away from the permanent magnet and into a spaced apart relationship with the permanent magnet so that the motor shaft is free to rotate and move the rotary to linear stage mechanism, and
wherein after the electromagnet ceases generating the magnetic force that is adapted to repel the magnetic force of the permanent magnet, the electromagnet is magnetically attracted toward the permanent magnet so that the electromagnet moves along the one or more pins and towards the permanent magnet so that the motor shaft locks and is unable to rotate.

13. A torque locking mechanism for preventing back driving of a motor in a brake system, the torque locking mechanism comprising a rotor and an electromagnet,
   wherein while the motor is generating torque, the torque locking mechanism is in an unlocked position, and after the motor ceases generating the torque, the torque locking mechanism slides into a locked position and is configured to prevent the motor from back driving, and
   wherein the rotor comprises a magnet that is configured to generate a magnetic force, the rotor is configured to rotate with an output shaft of the motor.

14. The torque locking mechanism of claim 13, wherein while the motor is generating the torque, the electromagnet is magnetically repelled away from the rotor, and after the motor ceases generating the torque, the electromagnet is magnetically attracted towards the rotor.

15. The torque locking mechanism of claim 13, wherein while the motor is generating the torque, the electromagnet is magnetically repelled away from the rotor, and after the motor ceases generating the torque, the electromagnet is magnetically attracted towards the rotor.

16. The torque locking mechanism of claim 13, wherein the electromagnet is configured to slide along one or more pins.

17. The torque locking mechanism of claim 16, wherein the electromagnet comprises a core, the core comprises one or more pockets that are each configured to receive one of the one or more pins.

18. The torque locking mechanism of claim 13, wherein the rotor comprises a friction disc, and when the torque locking mechanism is in the locked position, the electromagnet is in contact with the friction disc, and when the torque locking mechanism is in the unlocked position the electromagnet is spaced apart from the friction disc.

19. A brake system comprising:
a motor comprising a rotor and an output shaft, the rotor is rotationally connected to the output shaft, the rotor comprises a magnet; and
a torque locking mechanism comprising an electromagnet;
   wherein during a brake apply, the torque locking mechanism is in an unlocked position allowing the motor to generate torque to move a brake pad or a brake shoe to generate a clamp force; during the brake apply, the electromagnet is adapted to generate a magnetic force that opposes a magnetic force generated by the magnet so that the electromagnet moves away from the magnet and into the unlocked position;

wherein after the motor ceases generating the torque, the electromagnet ceases generating the magnetic force that opposes the magnetic force generated by the magnet and the electromagnet is magnetically attracted towards the magnet so that the electromagnet moves towards the magnet into a locked position to restrict the output shaft of the motor from rotating and/or back driving; in the locked position, the electromagnet is in contact with the rotor or in contact with one or more components that are in contact with the rotor.

20. The brake system of claim 19, wherein the electromagnet comprises a core that is rigidly connected to a housing of the motor so that the electromagnet is restricted from rotating.

* * * * *